United States Patent [19]

MacDoran

[11] 4,170,776

[45] Oct. 9, 1979

[54] SYSTEM FOR NEAR REAL-TIME CRUSTAL DEFORMATION MONITORING

[76] Inventor: Robert A. Frosch, Administrator of the National Aeronautics and Space Administration, with respect to an invention of Peter F. MacDoran, Altadena, Calif.

[21] Appl. No.: 863,024

[22] Filed: Dec. 21, 1977

[51] Int. Cl.$^2$ .............................................. H04B 7/00
[52] U.S. Cl. ......................... 343/112 D; 343/100 ME
[58] Field of Search ........ 343/112 R, 112 D, 100 ME

[56] References Cited

PUBLICATIONS

Shapiro et al., *Geo. Applications of Long-Baseline Radio Interferometry*, Earthquake Disp. Fields & The Rotation of Earth, Reidel Pub. Co., Holland, 1970, pp. 284–301.

*Primary Examiner*—Theodore M. Blum
*Attorney, Agent, or Firm*—Monte F. Mott; John R. Manning; Paul F. McCaul

[57] ABSTRACT

A system for use in detecting earth crustal deformation using an RF interferometer technique for such purposes as earthquake predictive research and eventual operational predictions. A lunar based RF transmission or transmissions from earth orbiting satellites are received at two locations on Earth, and a precise time dependent phase measurement is made of the RF signal as received at the two locations to determine two or three spatial parameters of the antenna relative positions. The received data are precisely time tagged and land-line routed to a central station for real-time phase comparison and analysis. By monitoring the antenna relative positions over an extended period of months or years, crustal deformation of the earth can be detected.

6 Claims, 2 Drawing Figures

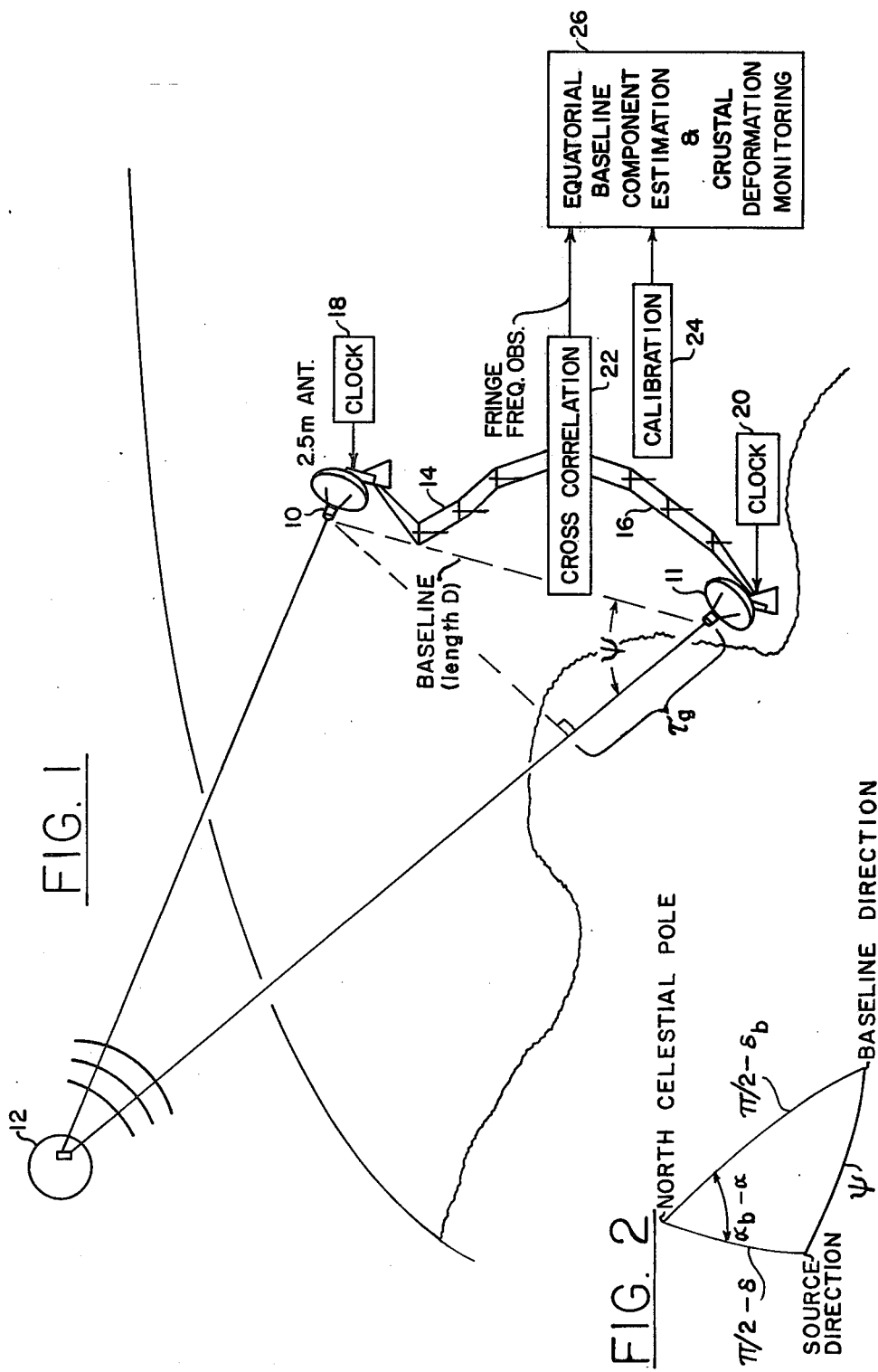

SYSTEM FOR NEAR REAL-TIME CRUSTAL DEFORMATION MONITORING

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method for near real-time crustal deformation monitoring using long-baseline radio interferometry.

There has been a continued and growing interest using long baseline radio interferometry for monitoring crustal deformation of the earth for prediction of earthquakes. See "Geophysical Applications of Long Baseline Radio Interferometry," by I. I. Shapiro and C. A. Knight in *Earthquake Displacement Fields and the Rotation of the Earth*, edited by L. Mansinha, et. al., and published by D. Reidel, Dordrecht, Netherlands, 1970. The present inventor has made a study of the feasibility of radio interferometry in this respect and the results were reported in a paper titled "Radio Interferometry for International Study of the Earthquake Mechanism", Acta Astronantica, VOL. 1, pp. 1427-1444, Perpamon Press (1974). The technique is not unlike that employed in stellar interferometers. It is operable on a very wide range of baseline lengths from 100 m to intercontinental separations. The term "Astronomical Radio Interferometric Earth Surveying" has been adapted for the technique, now often referred to by the acronym ARIES described in that report.

A precision geodetic measurement system based on ARIES has been designed and implemented through the use of a 9-m transportable antenna and fixed antennas, such as the NASA 64-m antenna of the Deep Space Communication Complex at Goldstone, California, and the 40-m telescope of the Owens Valley Radio Observatory. The system requires extragalactic random (quasar) radio signals received by the two antennas on a very long baseline to be recorded on magnetic tape for offline cross correlation. The system will detect subtle motions of the Earth's crust in three dimensions. Such motions are believed to precede an earthquake. If that is so, then a reliable earthquake prediction technique could be developed. The key to the system is the capability of measuring the difference in arrival of identical quasar radio signals at the two antennas on the baseline using atomic clocks as timing references and high speed computer techniques for cross correlation. The problem in adapting the system to real-time monitoring, or to near real-time monitoring, using quasar interferometry is cumbersome for real-time observations because of the need for utilizing wideband data communications lines and a plurality of quasar sources to eliminate the effects of system drifts and achieve full three dimensional measurements.

SUMMARY OF THE INVENTION

In accordance with the present invention, real-time crustal deformation monitoring can be achieved by independent stations in a radio interferometry system with a pair of antennas on earth illuminated by an artificial narrow spectrum radio signal from a source on the moon. Telephone circuits are used for real-time transmission of the radio signal received by the two antennas to a central station for cross correlation together with data from synchronized clocks at the stations for use in compensating for transmission delay differences in the telephone lines.

BRIEF DESCRIPTION OF THE DRAWINGS

FIG. 1 illustrates the conceptual elements for monitoring stations on a very long baseline.

FIG. 2 illustrates a spherical triangle which relates the right ascension, $\alpha$, and declination, $\delta$, of the source to the right ascension, $\alpha_b$, and declination, $\delta_b$, of the direction of the baseline vector.

DESCRIPTION OF PREFERRED EMBODIMENT

Referring to the drawings, real-time crustal deformation monitoring can be achieved by independent stations in a radio interferometry technique with a pair of small (2.5m) antennas 10 and 11 illuminated by S-band signals, or other artificial narrow band radio signals from a source 12 on the moon. The Apollo Lunar Surface Experiments Package (ALSEP) units placed on the moon by Apollo Flights 12, 14, 15, 16 and 17 represent a valuable source of radio illuminations for very long baseline interferometers (VLBI) on earth. Such interferometry has been reported by several investigators. Counselman, C. C., III, Hinteregger, H. F., and Shapiro, I. I., "Astronomical Applications of Differential Interferometry," Science, Vol. 178, pp. 607-608, 1972; Counselman, C. C., III, et al., "Lunar Baselines and Libration from Differential VLBI Observations of ALSEPS," The Moon, Vol. 8, pp. 484-489, 1973; and Slade, M. A., MacDoran, P. F., and Thomas, J. B., "Very Long Baseline Interferometry (VLBI) Possibilities for Lunar Study," in The Deep Space Network, Technical Report 32-1526, Vol. XII, pp. 35-39, Jet Propulsion Laboratory, Pasadena, Calif., 1972. However, no use has been made of the ALSEP signals for terrestrial geodesy, much less for crustal deformation monitoring in near real time.

Although the ALSEP signals will allow only fringe frequency observations and measurement of equatorial baseline components, 82% of vertical deformation can be sensed at a 34° latitude. This system will occupy sites previously measured in three dimensions by ARIES and monitored thereafter by this small antenna system. By comparing the ARIES equatorial baseline components, derived from quasar positions, with those determined by ALSEP signals, it will also be possible to relate lunar motions relative to the quasar reference frame within approximately 0.1 arc sec.

Unlike the quasars which emit very wideband radio spectral noise, the ALSEP is spectrally narrow, it being composed of telemetry signals from lunar-based scientific instruments. The ALSEP units are not radio transponders of the type used aboard interplanetary spacecraft. The ALSEP units do accept uplink commands from earth to control certain functions. However, no coherent response occurs from the device.

Although the ALSEP spectrum is narrow, about 6 KHz at 3 db, the radio flux arriving at the earth is equivalent to 50,000 Jansky ($10^{-26}$ w/m$^2$/Hz). By comparison, in ARIES experiments a strong quasar is considered to be a source of 5 or more Jy. This factor of $10^4$ difference in flux is then available to be traded off to achieve a simpler radio interferometry system, but at the expense of having introduced radio source dynamics into the problem. Fortunately, LURE (Lunar Ranging Experiment) and the ALSEP/Quasar VLBI experiments, have been successfully dealing with such problems and now represent a valuable resource for achieving the desired radio interferometric geodesy simplifications. See Bender, P. L., et al., "The Lunar Laser Ranging Experiment," Science, Vol 182, pp. 229-238, 1973, and Slade, M. A., Preston, R. A., Harris, A. W., Skjerve, L. J., and Spitzmesser, D. J., "ALSEP - Quasar Differential VLBI", in the Deep Space Network Progress Report, 42-33, Vol 2, pp. 37-47, Jet Propulsion Laboratory, Pasadena, Calif., 1976.

The RF spectral narrowness of the ALSEP radio signal does represent a limitation relative to the extremely wide RF continuum emissions of quasars. A broad RF emission spectrum allows the interferometer to precisely measure the delay function by signal cross-correlation within 0.1 nanosecond, but a narrow spectrum allows only the time rate of delay change to be precisely measured. See Williams J. G., "Very Long Baseline Interferometry and Its Sensitivity to Geophysical and Astronomical Effects," The Deep Space Network, Space Programs Summary, Tech Rep. 37-62, Vol. 2, p. 49, Jet Propulsion Laboratory, Pasadena, Calif., 1970. Three dimensional geodesy requires interferometry delay measurements from at least two quasars at substantially different declinations. In actual practice, ARIES experiments use ten to twenty quasars observed over periods of 8 to 26 hours because of a need for an alternate solution strategy caused by frequency system instabilities.

Having access to only delay rate data, also called fringe frequency, results in the interferometer being sensitive to only the two equatorial components (X and Y) of the baseline vector. The Z component insensitivity results in a loss of 18% of the information and some uniqueness of interpretation. More specifically, consider the effect of applying the rotation matrix (valid for latitude 35° ) to transform a unit local vertical displacement into geocentric baseline components:

$$\begin{bmatrix} -.26 & .83 & -.39 \\ -.49 & -.47 & -.73 \\ -.83 & 0 & .56 \end{bmatrix} \begin{bmatrix} 0 \\ 0 \\ 1 \end{bmatrix} = \begin{bmatrix} -.39 \\ -.73 \\ .56 \end{bmatrix}$$

Thus, a one meter increment in the local vertical appears as a 39 cm decrease in the geocentric X component (direction toward Greenwich) and a 73 cm decrease in the Y component (90° E of Greenwich). The spin axis component, which will not be sensed by this system, experiences a 56 cm increase.

The narrow RF spectrum of ALSEP does offer an important advantage of being easily recorded or transferred via telephone lines 14 and 16. A 3 KHz information bandwidth is suitable from signal to noise ratio considerations and quite reasonable for telephone circuit transmission for real-time cross-correlation signal detection processing.

The phone lines have instabilities that need frequent calibration. This can be accomplished by timeformatting the data in the usual Very Long Baseline Interferometry (VLBI) manner at each station using clocks 18 and 20. Each of the antenna stations will have a cesium clock which can be synchronized to the other clock within one microsecond or better. the time at each station is continually transmitted as spurs (pulses) over the telephone lines with the ALSEP signal, and the time received from each station is compared at a cross-correlator station 22. Thus, the phone line delay can be determined well within the 3 KHz bandwidth restrictions of the line.

Consider two or more 2.5 meter (~ 8 ft.) diameter dish antennas with efficiencies of 50%, 200 Kelvin S-band receiver operating temperatures, 3 KHz bandwidth, 10 second coherent integration time and receiving ALSEP signals equivalent to $5 \times 10^4$ Jy. The signal to noise ratio (SNR) of the cross-correlation output is then 27. See the paper by the present inventor in Acta Astronautica, supra.

By deriving the interferometer phase every 10 seconds over an 800 second interval it will be possible to extract the fringe frequency with a precision of 50 to 100 $\mu$Hz of S-band. Several 800 sec. samples of the fringe frequency over a wide range of sky visibility for the ALSEP units will allow the amplitude and phase of the diurnal signature to be determined along with the frequency system offset. Thus, equatorial baseline components can be measured. See Williams, supra, and the paper by the present inventor, supra. Having 50 $\mu$Hz data quality every 800 sec. implies 10 cm baseline precision.

The independently operated atomic frequency systems at each station introduce another error source. Ideally, a frequency system such as a hydrogen maser could be used with virtually no contribution to the allowable error. However, cost aspects make it important to consider other frequency sources for this study where unattended remote station operations are highly desirable. At 800 sec. a cesium frequency system having a stability of about $\Delta f/f = 1.6 \times 10^{-13}$ at S-band causes a 350 $\mu$Hz noise level. Incoherently combining these 350 $\mu$Hz observations over a 10 hour observation period allows improvement to an effective 50 $\mu$Hz observation which is equivalent to about a 10 cm baseline precision.

Because the equatorial baseline information is inherently diurnal in nature, special care must be taken to either stabilize the receiving system or to explicitly measure possible thermal phase variations over the tracking pass. Such phase calibration can be performed and transmitted along with the time-formatted video data.

Based upon LURE data presented by Williams, J. G., "Lunar Laser Ranging: Present Results and Future Plans," EOS, Trans., Am. Geophys. Union, Vol. 56, 970, 1975, the lunar ephermerides are believed to be internally consistent to within approximately 0.01 arc sec. Considering the two small antenna stations to be deployed 100 Km apart at established ARIES sites, a 0.01 arc sec lunar position internal error causes a 0.5 cm baseline error. Possible angular rotations between the lunar frame and the quasar frame might be present and could be sensed at about the 0.1 arc sec level by this 100 Km baseline. A 100 Km baseline is short enough that diurnal variation of the ionosphere are self-cancelling in the differential measurement that is intrinsic to interferometry. Residual effects due to ionospheric clouds of scale <100 Km are estimated to be 10 cm per pass and random on a pass to pass basis.

It is also possible to transmit surface meteorology through the phone line. The radiosonde calibrations will be accurate to 3 cm at zenith and considering that tracking data will be taken to only 20° elevation angles, the baseline will be affected at about the 10 cm level on a single pass basis. Water vapor radiometers could calibrate the set tropospheric delay effects with a path equivalent accuracy of 2 cm, however, such instruments are relatively expensive and may be non-optimal for continuous monitoring on a time scale of months to years. Solar hydrometers may serve the wet tropospheric calibration need.

In summary, a radio interferometry method has been proposed which uses the relatively strong S-band radio signals coming from the ALSEP stations on the moon. These strong signals allow several simplifications to independent station radio interferometry such as small 2.5 m antenna sizes and real time cross correlation. The frequency system requirements of $\Delta f/f = 2 \times 10^{-13}$, $\tau = 800$ sec, Are obtainable commercially. Stations of the type discussed could be implemented and operated at comparatively low cost and could make important geophysical contributions to the determination of crustal deformations. Commercial telephone lines coupling the antennas stations to the cross correlator make near real-time cross correlation possible. The cross-correlation data are then used with calibration data 24 by a computer 26 programmed for equatorial baseline component estimation and crustal deformation monitoring.

The sensitivity to geophysical and astronomical effects have been investigated by J. G. Williams, JPL Space Programs Summary 37-62, Vol II, pp. 49-55, Mar. 31, 1970. Although the system then contemplated necessarily involved recording the output of two antenna separately on magnetic tapes later brought together for processing, the geophysical and astronomical effects remain essentially the same where, as in the present invention, the output of the two antenna are coupled to a cross correlator for near real-time processing by conventional telephone. By time tagging the separate outputs with synchronized clock outputs, it is possible to tolerate some real time delay in transmission from one antenna longer than from the other, and to even experience changes in transmission delays as the telephone network reroutes the output of one antenna according to requirements of ever changing traffic on the telephone lines. By time formatting the separate data streams with the synchronized clock outputs, it is possible to virtually eliminate the delay effects of the telephone transmission lines linking the receiving stations to the cross correlator. Consider a 6 KB/s data transmission rate corresponding to a 3kHz information bandwidth. A frame of data might consist of 600 bits with the first 6 bits all binary 1's and the first of the 6 bits synchronized to a 10 pulse per second output from the clock. The remaining 594 bits of each data frame would consist of a binary sampling of the station receiver output which would appear as an almost random series of binary bits. In this manner it would be possible to construct at the cross correlator a software algorithm which synchronizes the two arriving data streams every 0.1 seconds without regard to telephone variatons up to approximately 50 milliseconds. To guard against delay and variatons greater than 50 m sec, a 10 bit series of all 1's might be used as a beginning of frame code every integer second with leading bit coincident with the one pulse per second output of the synchronized clock.

At the cross correlator, the arriving bit stream from the station geometrically nearest to the moon will be buffer delayed typically by 5 bits or less corresponding to 0.84 m sec (allowing station separations up to 250 Km). Adjusting the bit streams plus or minus 5 bits will keep the cross correlation function maximized so that the time variable nature of the cross correlation function (i.e. fringe frequency) can be sensed and analyzed for the interferometer equatorial baseline information being sought.

The technique of interferometry as investigated by Williams, supra, but applied to the present invention, will now be briefly reviewed. Assuming the two antennas are separated by a distance D. The direction of the radio source 12 makes an angle $\psi$ to the baseline between the antennas. There will be a difference with time of reception of the signal at the two antennas proportional to the angle $\psi$, at the farthest antenna from the source. The time delay $\tau_g$, is given by $$\tau_g = D/C \cos \psi \tag{1}$$

where c is the speed of light and D is the baseline distance. The electric field at antenna 11 is given by $$E_{11} = A \cos \omega t \tag{2}$$

where A is the amplitude, $\omega$ the frequency, and t the time. The electric field of the other antenna is given by $$E_{10} = A \cos \omega (t - \tau_g) \tag{3}$$

The voltages received by the cross correlator are given by $$V_{11}(t) = A \cos \omega t + \phi 11 \tag{4}$$

$$V_{10}(t) = A \cos \omega t - \omega \tau_g + \phi 10 \tag{5}$$

Phase shifts $\phi 11$ and $\phi 10$ are introduced by instrumental and atmospheric delays which are explicitly calibrated (24) in the data analysis.

The frequency of the signal from the antenna 10 is $$F = \omega - \omega d\tau_g/d_t \tag{6}$$

The quantity of $\omega d\tau_g/dt$ is known as the fringe rate $\nu_F$.

It is the negative doppler shift between the two antenna sites. Cross correlaton allows the time delay $\tau_g$ and the fringe rate $\nu_F$ to be measured.

To be useful, the angle $\psi$ must be related to the right ascension and declination of the source. FIG. 2 illustrates a spherical triangle which relates the right ascension, $\alpha$ and declination, $\delta$, to the right ascension, $\alpha_b$, and declination, $\delta_b$, of the direction of the baseline vector. From spherical trigonometry, the law of cosines gives $$\cos \psi = \sin \delta \sin E_b + \cos \delta \cos \delta_b \cos (\alpha_b - \alpha) \tag{6}$$

The baseline is fixed to the earth so that its right ascension $\alpha_b$ can be related to its constant longitude $\lambda_b$ and the right ascension of Greenwich $\alpha_g$ (t) by $$\alpha_b = \lambda_b + \alpha_g (t) \tag{7}$$

Substituting Eq. (6) in Eq. (1) gives $$\tau = \tau_g + \tau_o$$

where $\tau_o$ represents the synchronization of the station clocks, $$\tau_g = D/c[\sin \delta \sin \delta_b + \cos \delta \cos \delta_b \cos (\alpha_b - \alpha)] \tag{8}$$

The fringe rate is given by $$\nu_F = -\omega D/c \, \omega_e \cos \delta \cos \delta_b \sin (\alpha_b - \alpha) + \nu_o \tag{9}$$

where $\omega_e$ is the rotation rate of the earth, $0.73 \times 10^{-4}$ rad/s and $\nu_o$ is the frequency offset caused by the fact that the clocks run at slightly different rates. If $\nu_F$ is expressed in Hertz, then $$\nu_F = -D\omega_e/\Lambda \cos \delta \cos \delta_b \sin (\alpha_b - \alpha) + \nu_o \tag{10}$$

The equatorial projection of D will be $$r_b = D \cos \delta_b \tag{11}$$

so that the fringe rate becomes $$\nu_F = -(\omega_e r_b)/\Lambda \cos \delta \sin (\alpha_b - \alpha) + \nu_o \tag{12}$$

For $r_b = 250$ km and $\Lambda = 13$ cm, the coefficient $\omega_e r_b/\Lambda \approx 140$ Hz. Equation (8) yields the time-delay quantity and is useful when the stations are able to receive wideband signals. For a narrow band signal, as in the present invention, Equation (12) is more useful as it yields the fringe rate. In otherwords, for a narrow band signal it is preferable to operate in the frequency domain, rather than in the time domain. The frequency offset term $\nu_o$ will not be known a priori with the necessary 50μHz (i.e. $\Delta f/f = 2 \times 10^{-14}$) accuracy and therefore should be simultaneously estimated with the baseline parameters $r_b$ and $\alpha_b$. In order for the estimation to be valid, it is critical that the frequency systems driving the clocks have no diurnal dependence because $\nu_o$ will then become confused with the $r_b$ and $\alpha$b terms.

From the foregoing, it can be appreciated that the fringe rate (fringe frequency observed) as the output of the cross correlation function may be used to estimate the equatorial baseline component $r_b$ and $\alpha_b$ for crustal deformation monitoring applications. By measuring $r_b$ and $\alpha_b$ over an interval of days, months and years, it will be possible to detect crustal strain accumulations and may significantly contribute to an earthquake predictive system.

Although a particular embodiment has been illustrated and described, it is recognized that modifications and variations may readily occur to those skilled in the art such as substitution of radio signals from Global Positioning System (GPS). With the advent of the GPS as an available signal source several important features can be implemented. When fully deployed the GPS will consist of 24 satellites in 12 hour period orbits. At least four satellites will be in view at every global location at all times. The satellite orbits will be known from earth based tracking data to an accuracy of two meters. Such orbital accuracy translates to be 2 cm accuracy in differential earth positioning measurements for station separations of approximately 120 Km. The GPS radio transmissions are of a broadband type unlike the narrowband ALSEP signals discussed previously. By sampling the interferometer phase at two or more windows within the two bands (1.22 and 1.57 GHz) transmitted by GPS, it is possible to construct a highly precise delay observable by the method of bandwidth systhesis described by J. B. Thomas, "An Analysis of Long Baseline Radio Interferometry," Part III, Jet Propulsion Laboratory Technical Report 32-1526, Vol. XVI, pp. 47-64 (August 1973). The two bands separated by 350 MHz provides the method for removing the ionospheric error by electromagnetic dispersion as descried by R. L. Koehler, "Radio Propagation Measurements of Pulsed Plasma Streams From the Sun Using Pioneer Spacecraft," J. Geophys. Res. 73, 15, 4883-4894 (1968). By measuring the delay obtained from four or more satellites at widely separated sky locations, Eq. 8 can be used to estimate $r_b$ and $\alpha_b$, as before, but now the term $Z_b = D \sin \delta_b$ can be determined giving a full three dimensional baseline description. One of the four delay observations is used to estimate the arbitrary phase offset term of the bandwidth synthesis, analogous to clock synchronization or clock offset term. The near realtime advantages of using telephone lines remains as in the case of ALSEP because the GPS transmissions have high signal strength across their broadcast bands.

The availability of several satellites simultaneously in view begins to approximate the ARIES operational method using quasars. The four or more satellite signal sources allows the baseline components and clock offset to be estimated simultaneously in a time span determined by how rapidly the delay observables can be derived at the two frequency bands from each satellite. Depending on the particular implementation of telecommunication elements, the necessary delay measurements could be collected every few minutes thus significantly reducing the demands upon the frequency and timing system. For example, to derive delay precisions equivalent to 10 cm every 10 minutes requires a frequency stability of $\Delta f/f = 5 \times 10^{-13}$, readily met by commercially available and relatively inexpensive rubidium frequency systems. Based upon 90 minutes of data an effective 3 cm error will be contributed by the time and frequency system.

An important advantage of detecting GPS by cross correlation is that no knowledge of the exact nature of the transmitted pseudo random digital code is required, unlike the case with the original GPS implementation. In other words, cross correlation detection of GPS transmissions eliminate need for explicit knowledge of the form of the digital code being transmitted, which may in certain circumstances be transmitted in a secret form. Thus, the GPS will become a geodetic resource to all users.

Although particular embodiments of the invention have been described and illustrated herein, it is recognized that modifications and variations may readily occur to those skilled in the art. It is therefore intended that the claims be interpreted to cover such modifications and variations.

What is claimed is:

1. In a system for monitoring crustal deformation using long-baseline radio interferometry, the method of receiving at two independent stations a radio signal of limited spectrum from a source at a known location is space, maintaining synchronized clocks at said station, time tagging the radio signal received at each station, transmitting the time-tagged radio signal received at each station to a convenient location for cross correlation using communication channels having a bandwidth sufficient for said limited spectrum, adjusting the transmission delay of one radio signal relative to the other to synchronize time tags prior to cross correlation, and estimating the interferometer delay or delay rate in order to derive baselines for near real-time crustal deformation monitoring.

2. The method of claim 1 wherein said source is an artificial narrow band radio signal, and said communication channels are comprised of telephone lines.

3. The method of claim 2 wherein said source is an S-band transmitter on the moon.

4. The method of claim 2 wherein said source is an L-band signal from a global positioning system satellite.

5. The method defined by claim 4 including rapid simultaneous estimating of baseline using several global positioning system satellites in order to significantly reduce the stability requirements of the time and frequency systems.

6. In a monitoring system, using a pair of antennas at separated stations on earth for receiving a radio signal of limited spectrum from an artificial source at a known location in space and a pair of synchronized clocks, one clock at each station for time tagging the radio signal received, the method of transmitting the time tagged radio signals from the stations to a third station, adjusting the transmission delay time of one radio signal relative to the other to synchronize time tags, and cross correlating the signals thus time synchronized for obtaining fringe frequency observations to be used in near real-time crustal deformation monitoring.

* * * * *